United States Patent
Lawton et al.

(10) Patent No.: US 12,043,494 B2
(45) Date of Patent: Jul. 23, 2024

(54) VIBRATORY FEEDERS

(71) Applicant: Frito-Lay Trading Company GmbH, Berne (CH)

(72) Inventors: Simon Lawton, Berne (CH); Stacie Tibos, Berne (CH); Lindsay Dobson, Berne (CH)

(73) Assignee: Frito-Lay Trading Company GmbH, Bern (CH)

( * ) Notice: Subject to any disclaimer, the term of this patent is extended or adjusted under 35 U.S.C. 154(b) by 59 days.

(21) Appl. No.: 17/925,567

(22) PCT Filed: May 28, 2021

(86) PCT No.: PCT/EP2021/064447
§ 371 (c)(1),
(2) Date: Nov. 15, 2022

(87) PCT Pub. No.: WO2021/244989
PCT Pub. Date: Dec. 9, 2021

(65) Prior Publication Data
US 2023/0192410 A1    Jun. 22, 2023

(30) Foreign Application Priority Data
Jun. 2, 2020  (GB) ................................ 2008273

(51) Int. Cl.
*B65G 27/16*    (2006.01)
(52) U.S. Cl.
CPC .................................. *B65G 27/16* (2013.01)

(58) Field of Classification Search
None
See application file for complete search history.

(56) References Cited

U.S. PATENT DOCUMENTS

| 3,123,203 | A |   | 3/1964 | Baker |  |
|---|---|---|---|---|---|
| 3,130,831 | A | * | 4/1964 | Musschoot | B65G 27/00 |
|  |  |  |  |  | 74/61 |
| 3,199,664 | A |   | 8/1965 | Baker |  |
| 3,568,824 | A | * | 3/1971 | Tarzian | B65G 27/00 |
|  |  |  |  |  | 198/757 |
| 3,581,871 | A | * | 6/1971 | Forman | B65G 27/00 |
|  |  |  |  |  | 177/121 |
| 3,954,169 | A | * | 5/1976 | Clark | B65G 27/32 |
|  |  |  |  |  | 198/767 |

(Continued)

FOREIGN PATENT DOCUMENTS

| CN | 109051669 A | * | 12/2018 | ............. | B65G 27/24 |

OTHER PUBLICATIONS

International Preliminary Report on Patentability issued on Dec. 6, 2022 in PCT/EP2021/064447.

(Continued)

*Primary Examiner* — Joseph A Dillon, Jr.
(74) *Attorney, Agent, or Firm* — Barnes & Thornburg LLP; G. Peter Nichols (57) ABSTRACT

A vibratory feeder having a feeder plate comprising a layered structure of a solid material and a material containing voids, such as a metal foam, sintered metal or glass, a ceramic, a foamed polymer, an aerogel or an arrangement of spacers. Scarf plates are particularly described.

13 Claims, 12 Drawing Sheets
(5 of 12 Drawing Sheet(s) Filed in Color)

(56) References Cited

U.S. PATENT DOCUMENTS

| | | | | |
|---|---|---|---|---|
| 4,002,270 | A * | 1/1977 | Reiner | B65G 27/32 |
| | | | | 198/572 |
| 5,074,403 | A * | 12/1991 | Myhre | B65G 27/32 |
| | | | | 198/769 |
| 5,143,418 | A * | 9/1992 | Fouquet | B62D 25/2054 |
| | | | | 52/177 |
| 5,207,310 | A * | 5/1993 | Maddocks | B65G 27/34 |
| | | | | 198/370.01 |
| 5,404,995 | A * | 4/1995 | Graham | B65G 27/08 |
| | | | | 198/759 |
| 5,602,433 | A * | 2/1997 | Brence | B65G 27/08 |
| | | | | 310/15 |
| 7,955,031 | B2 * | 6/2011 | Powell | B65G 47/1421 |
| | | | | 406/75 |
| 8,312,818 | B2 * | 11/2012 | Poncet | B65G 65/44 |
| | | | | 222/199 |
| 10,815,064 | B1 * | 10/2020 | Ahmed | B65G 27/04 |
| 10,961,058 | B2 * | 3/2021 | Helfenstein | B65G 27/32 |
| 10,974,908 | B2 * | 4/2021 | Dicristofano | B65G 27/32 |
| 2009/0272627 | A1 * | 11/2009 | Kraus | B65G 27/32 |
| | | | | 198/759 |
| 2018/0062065 | A1 | 3/2018 | Arakawa et al. | |

OTHER PUBLICATIONS

International Search Report issued in PCT/EP2021/064447 on Sep. 28, 2021.
Written Opinion issued in PCT/EP2021/064447 on Sep. 28, 2021.
Examination Report issued in GB2008273.1 on Dec. 3, 2020.

* cited by examiner

VIBRATORY FEEDERS

This application is a U.S. nationalization under 35 U.S.C. § 371 of International Patent Application No. PCT/EP2021/064447 filed May 28, 2021, which claims priority to GB 2008273.1 filed Jun. 2, 2020; the entire contents of each are incorporated herein by reference.

FIELD OF THE INVENTION

The invention relates to improvements in vibratory feeders, particularly in respect of improvements to feeder plates that are used as a part of such feeders. The invention is also especially relevant to vibratory feeders that use a scarf plate.

BACKGROUND AND PRIOR ART

The continuous delivery of desired amount of powdered components is a common requirement in the process industries, particularly when manufacturing processes are continuous in nature, rather than batch processes. It has been common practice to vibratory feeders to carry out this operation. Vibratory feeders are well-known in the art and comprise a powder hopper that delivers powder onto a plate. The plate is vibrated, typically by an electromagnet provided with an alternating voltage acting on a magnetically-susceptible element attached to the plate, which is mounted on a flexible support. The induced vibration in the plate, causes the powder to move along the plate and fall off an edge, thereby depositing powder in or on the process stream. The rate of flow of the powder is may be altered by altering the amplitude or frequency of the applied voltage.

In some settings, a stream of powder is added to a passing stream of other components, which are then subsequently mixed. Examples of this process operation might be the addition of e.g. sugar to a passing stream of particulate food, such as a breakfast cereal, which might then be subsequently shaken or otherwise mixed to evenly distribute the sugar.

In other settings, however, the stream of powder is deposited directly onto the process stream where the powder sticks to other components and no further mixing occurs. Examples of this process operation might include the addition of powdered materials onto a web of material that is subsequently laminated. In the food industries, another example might be the addition of flavourings to the surface of flat food items that are subsequently packaged without significant further agitation of the products. In these processes, the absence of further mixing leads to any unevenness of the spatial distribution of the powdered ingredient onto the product stream being reflected in unevenness of the ingredient in the final product. This is particularly a problem in respect of unevenness of powder distribution across the width of the vibratory feeder plate.

In U.S. Pat. Nos. 3,199,664, and 3,123,203, there are provided vibratory feeders wherein an internal material (balls or foam) impart the movement, i.e. the top and bottom layers move relative to each other, such that the product moves along the top layer by imparting motion of the top layer relative to the bottom layer. However, allowing relative motion between the top and bottom layers allow additional degrees of freedom of motion which is undesirable for uniform particle delivery.

It is among the objects of the present invention to provide a vibratory feeder where the desired motion is imparted without variation to the top surface with the particles being transported on it, thus enabling a more uniform particle delivery.

It is also among the objects of the present invention to provide a vibratory feeder with reduced spatial variation of powder delivery.

SUMMARY OF THE INVENTION

Accordingly, the invention provides a vibratory feeder comprising a feeder plate, said feeder plate comprising a laminate of two different layers: (a) a first solid layer; and (b) a second layer comprising voids.

Preferably said feeder plate further comprises a third layer of solid material arranged on the opposite side of said second layer to said first solid layer.

In either instance, it is preferred that said second layer comprises a metal foam.

In either instance, it is alternatively preferred that said second layer comprises sintered metal.

In either instance, it is alternatively preferred that said second layer comprises a ceramic.

In either instance, it is alternatively preferred that said second layer comprises a cellular matrix.

In either instance, it is alternatively preferred that said second layer comprises an arrangement of spacers.

In either instance, it is alternatively preferred that said second layer comprises a foamed polymer.

In either instance, it is alternatively preferred that second layer comprises glass, such as sintered glass.

In either instance, it is alternatively preferred that said second layer comprises an aerogel.

In any aspect of the invention, it is preferred that the stiffness of said feeder plate is greater than the stiffness of a feeder plate of the same mass formed from the solid material of said first layer.

In any aspect of the invention, it is preferred that the stiffness of said feeder plate is in the plane perpendicular to the delivery surface of the vibratory feeder.

It may alternatively be preferred that the stiffness of said feeder plate is in the plane parallel to the delivery surface of the vibratory feeder.

Also, it may alternatively be preferred that the stiffness of said feeder plate is isotropic.

Also in any aspect of the invention it is preferred that said feeder plate is a scarf plate.

BRIEF DESCRIPTION OF THE FIGURES

The patent or application file contains at least one drawing executed in color. Copies of this patent or patent application publication with color drawing(s) will be provided by the Office upon request and payment of the necessary fee.

The invention will be describer with reference to the accompanying drawings, in which:

FIGS. 2A and 2B are elevation illustrations of a known vibratory feeder plate;

DESCRIPTION OF PREFERRED EMBODIMENTS

Figures 1, 2:
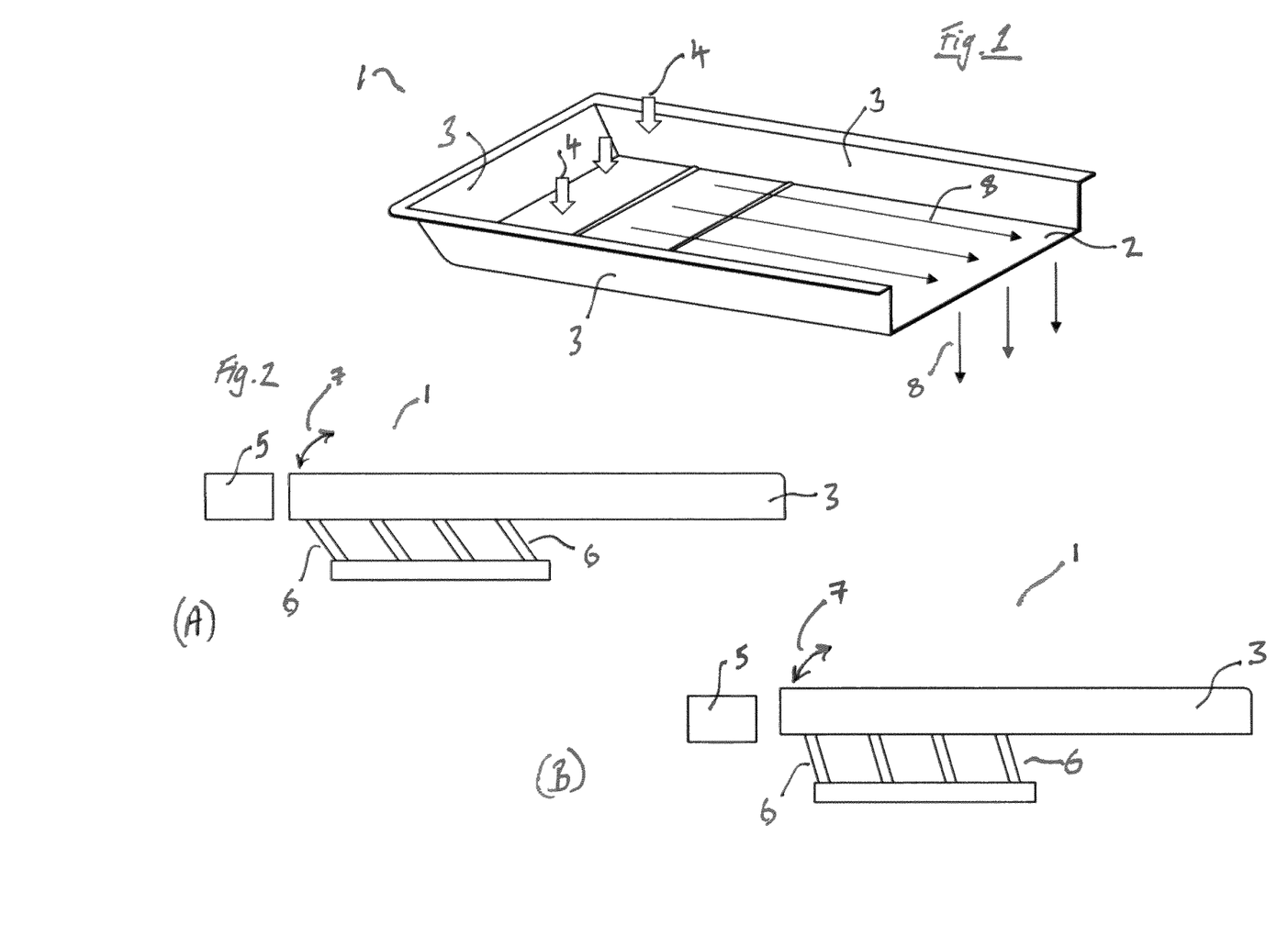
FIG. 1 is a perspective illustration of a known vibratory feeder plate.

FIG. 1 illustrates, in perspective view, a portion of a known vibratory feeder, generally indicated by 1. The feeder 1 comprises a feeder plate 2 surrounded on three sides by walls 3. Powder is deposited onto the feeder plate 2 as indicated by the arrows 4. Vibration of the plate along its long axis causes powder to flow towards the open edge of the feeder plate 2, as indicated by the arrows 8, where it falls off, to be deposited on a process line.

FIGS. 2A-2B show, in elevation view, the vibratory feeder of FIG. 1, in elevation view. An electromagnet 5 is arranged to deliver a cyclic force to the feeder plate 2, which is mounted on flexible mounts 6, which causes the feeder plate to oscillate as indicated by the curved arrows 7. The walls 3 of the feeder 1 provide a degree of structural rigidity to the feeder plate 2.

Figure 3:
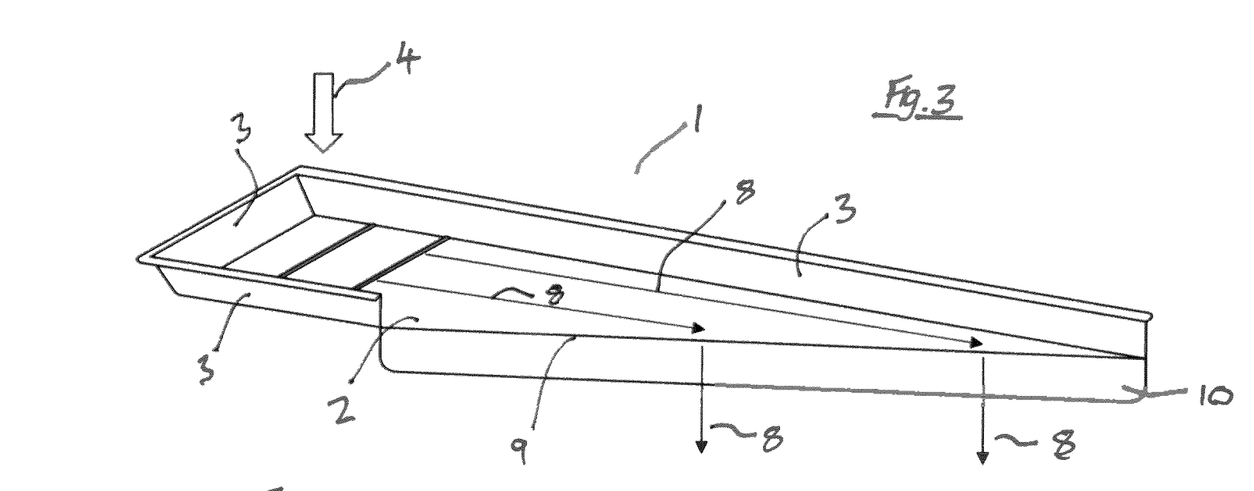
FIG. 3 is a perspective illustration of a known vibratory feeder scarf plate.

FIG. 3, illustrates, in perspective view, a portion of a different known vibratory feeder, generally indicated by 1. Like elements already described in relation to FIG. 1 are numbered correspondingly, and will not be described further. In this feeder, the feeder plate 2 is shaped such that the open edge 9 of the plate 2 is at an angle, i.e. not perpendicular to the flow direction of the powder. A downwardly-extending skirt 10 is also provided at the edge 9 of the feeder plate 2. The skirt 10, as well as the walls 3, of this this feeder again provide a degree of structural rigidity to the feeder plate 2. This configuration of the feeder plate 2, having the angled edge 9, is referred to in the industry as a "scarf plate".

Figure 4:
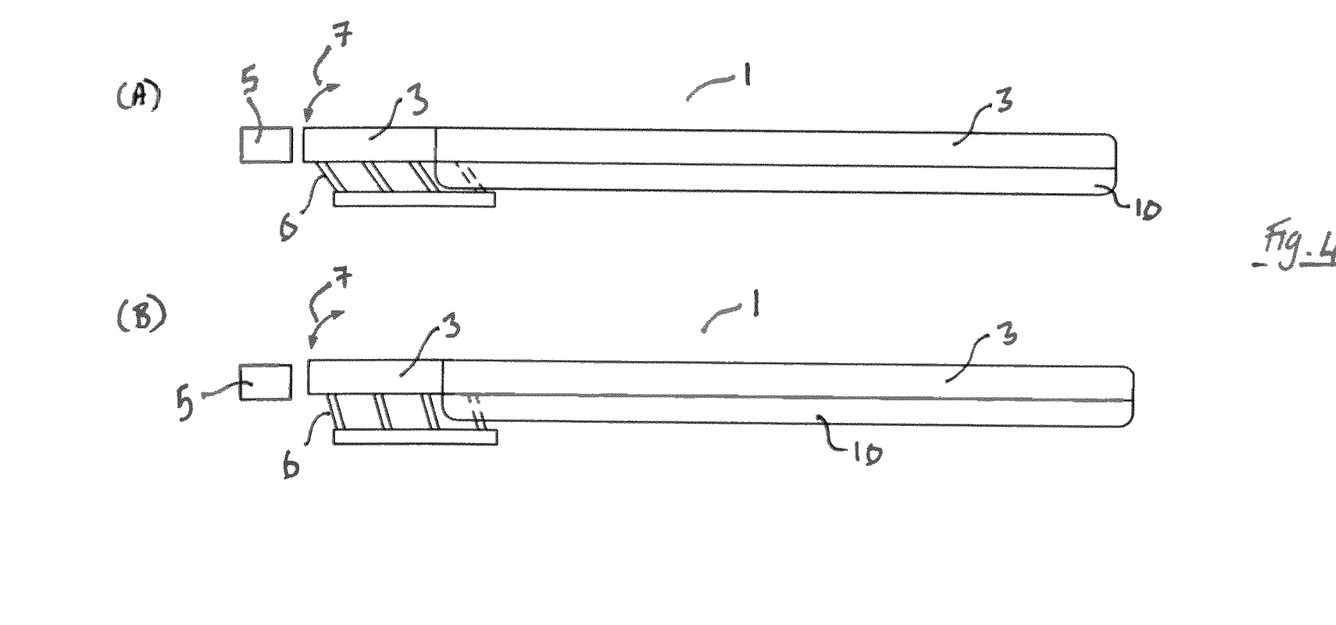
FIGS. 4A and 4B are elevation illustrations of a known vibratory feeder scarf plate.

FIGS. 4A-4B illustrate, in elevation view, the vibratory feeder of FIG. 3, in the way that FIGS. 2A-2B relate to FIG. 1. Like elements already described in relation to preceding figures are numbered correspondingly, and will not be discussed further.

Figure 5:
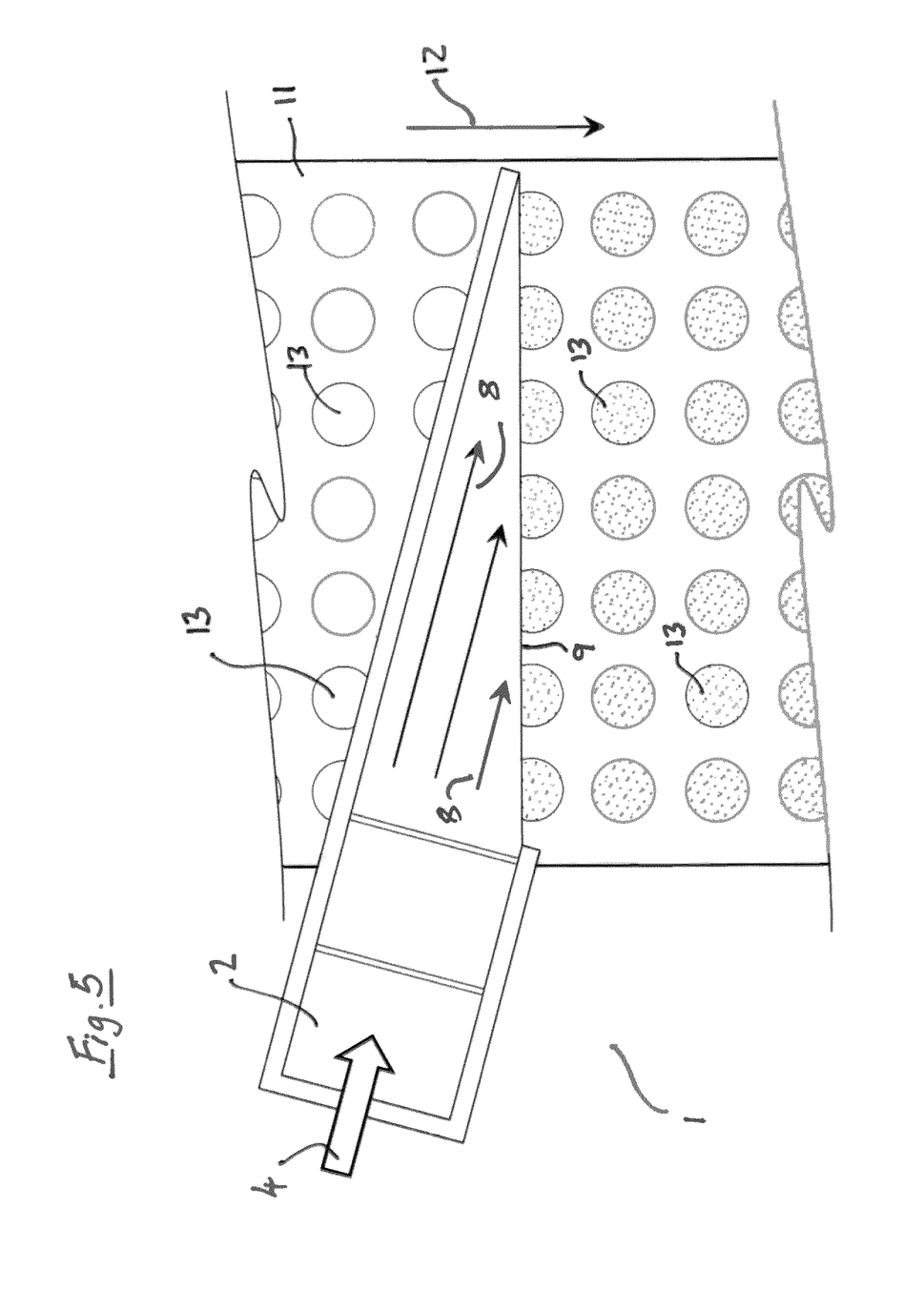
FIG. 5 is a plan illustration of a scarf plate vibratory feeder depositing a powder onto items on a conveyor belt.
Figure 6:
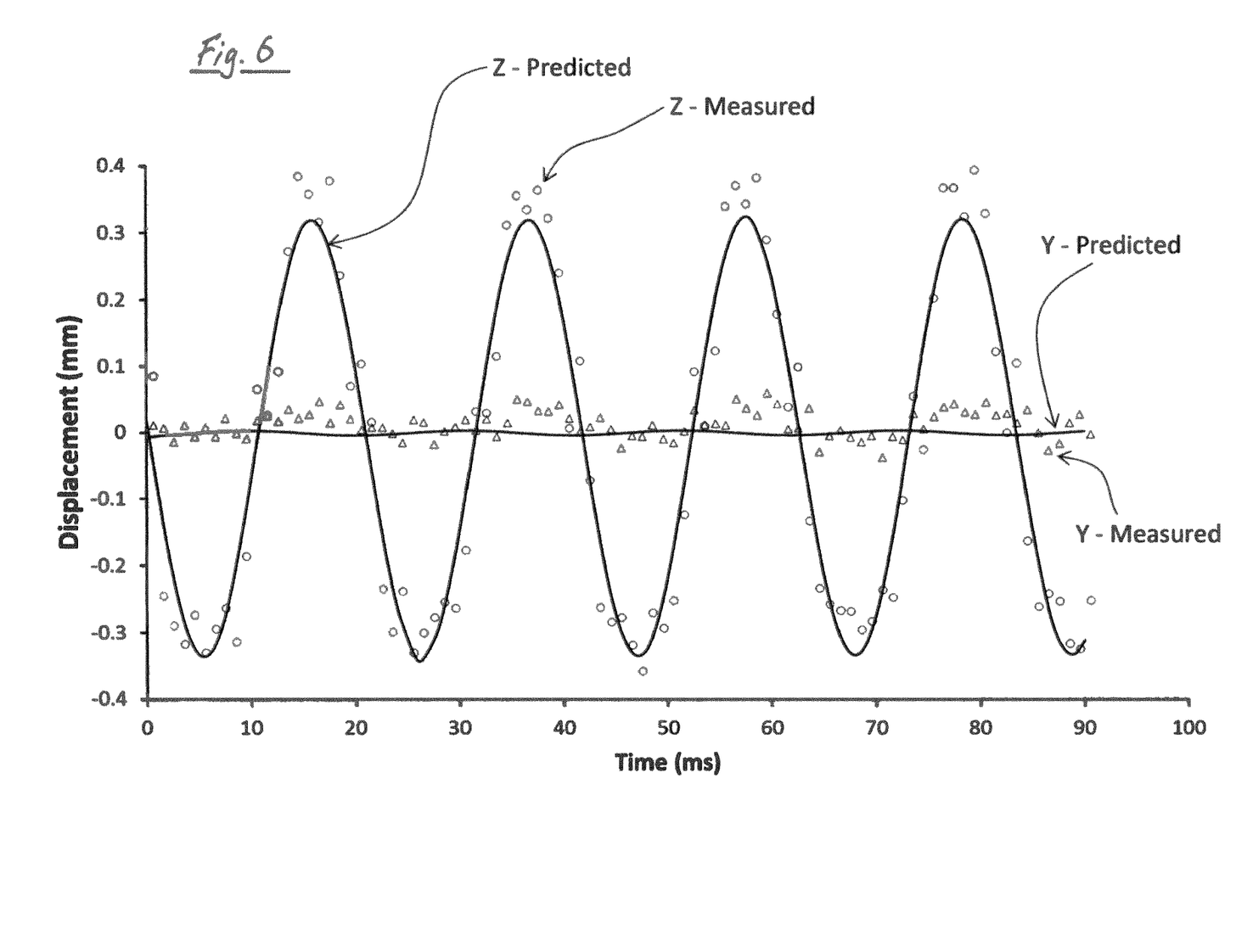
FIG. 6 is a graph showing measured and predicted values of displacement of a point on a scarf plate in the vertical (Y) and side-to-side (Z) directions.
Figure 7:
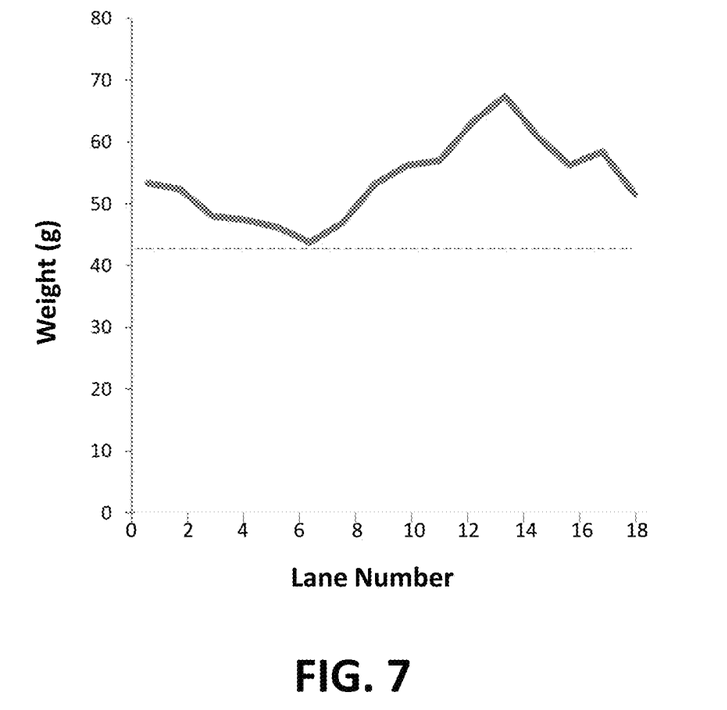
FIG. 7 is a graph showing variation in deposited weight of powder across a known scarf plate.

One known advantage of the scarf plate version of a vibratory feeder is that the inlet hopper that deposits powder onto the feeder plate 2 can be positioned to one side of a process line (e.g. a conveyor belt), allowing the whole feeder system to be more conveniently located, and making it easier to remove the feed from the process line for e.g. cleaning. This type of arrangement is illustrated in plan view in FIG. 5. This illustration shows a portion of the vibratory feeder 1 situated above a conveyor belt, moving in the direction of the arrow 12. Powder is deposited onto the scarf plate 2 as indicated by arrow 4. The powder flows down the scarf plate in the direction of the arrows 8 and falls off the edge 9 and onto the products 13 on the conveyor belt 11. As the products pass under the edge 9 of the scarf plate 2, powder is deposited onto the surface of the products 13 as illustrated.

The movement of the feeder plate 2 in the above examples might be presumed to by a simple cyclic oscillation, as indicated by the arrows 7. Such an oscillatory motion has the effect of lifting, and propelling particles along the plate, as indicated by the arrows, 8. Random scatter of particles perpendicular to the arrows 8 would lead to an even distribution of particles across the plate. If that were the only motion, then an even dosing of particles across the width of the open edge of the plate would be expected to result. However, experimental observation shows that this is not the case, and there can be significant difference in flow rates of powder leaving the plate 2 at different positions along the edge.

In order to investigate this phenomenon, the inventors carried out a study of the movement of the plates. A high-speed, high-resolution camera system was used to monitor the displacement of the surface of a vibratory feed plate at a number of positions, and with various excitation regimes by the use of digital image correlation (DIC). A scarf plate geometry was chosen, reflective dots were added to the surface of the scarf plate, to aid imaging. The results of the imaging showed that the movement of the surface of the scarf plate was far more complex than a simple oscillatory motion, but that flexing of the plate created complex patterns of vertical displacement across the surface of the plate.

A detailed mathematical model of the scarf plate was created, combining plate eigenfrequency analysis and modal superposition and compared to the experimental data obtained from the DIC analysis. The prediction of the model matched the experimental data very closely, and showed resonance of the plate, and complex patterns of displacement across the plate. FIG. 6 shows just one example of the measured and predicted displacement along the Z-axis (vertical displacement—open circles) and along the Y-axis (side-to-side displacement perpendicular to main flow of powder—open triangles).

An experiment was then carried out to measure the flow of powder across the width of a scarf plate by collecting powder from each of a number of "lanes" across the width of the edge 9 of the scarf plate. The width was divided into 18 such lanes, and powder collected over a set interval. FIG. 7 shows, graphically, the results of that experiment. The solid line shows the mass of powder collected from each of the lanes, and the dashed line illustrates a target desired powder loading. It can be seen that there is considerable variation of powder deliver across the width of the device.

If the target desired powder loading is a minimum powder requirement, then all of the material delivered above that target can be characterised as waste.

Figure 8:
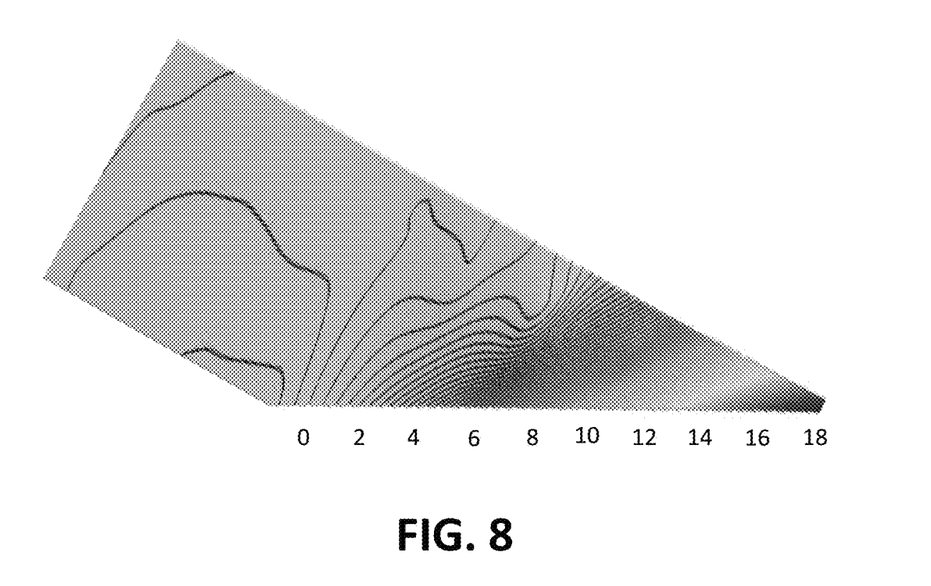
FIG. 8 is a simulation showing variation total displacement across a known scarf plate.

FIG. 8 illustrates a contour map showing the distribution of total displacement across the scarf plate as predicted by the model. It can be seen that there is a tendency for greater displacement at the greater lane numbers (towards the distal end of the plate), as seen in the experimental data.

The correspondence between the model predictions and the surface displacement measured by DIC and the correspondence between the model predictions and the experimental measurement of powder flows gives confidence that the model gives a good prediction of the performance of the vibratory feeder.

Figure 9:
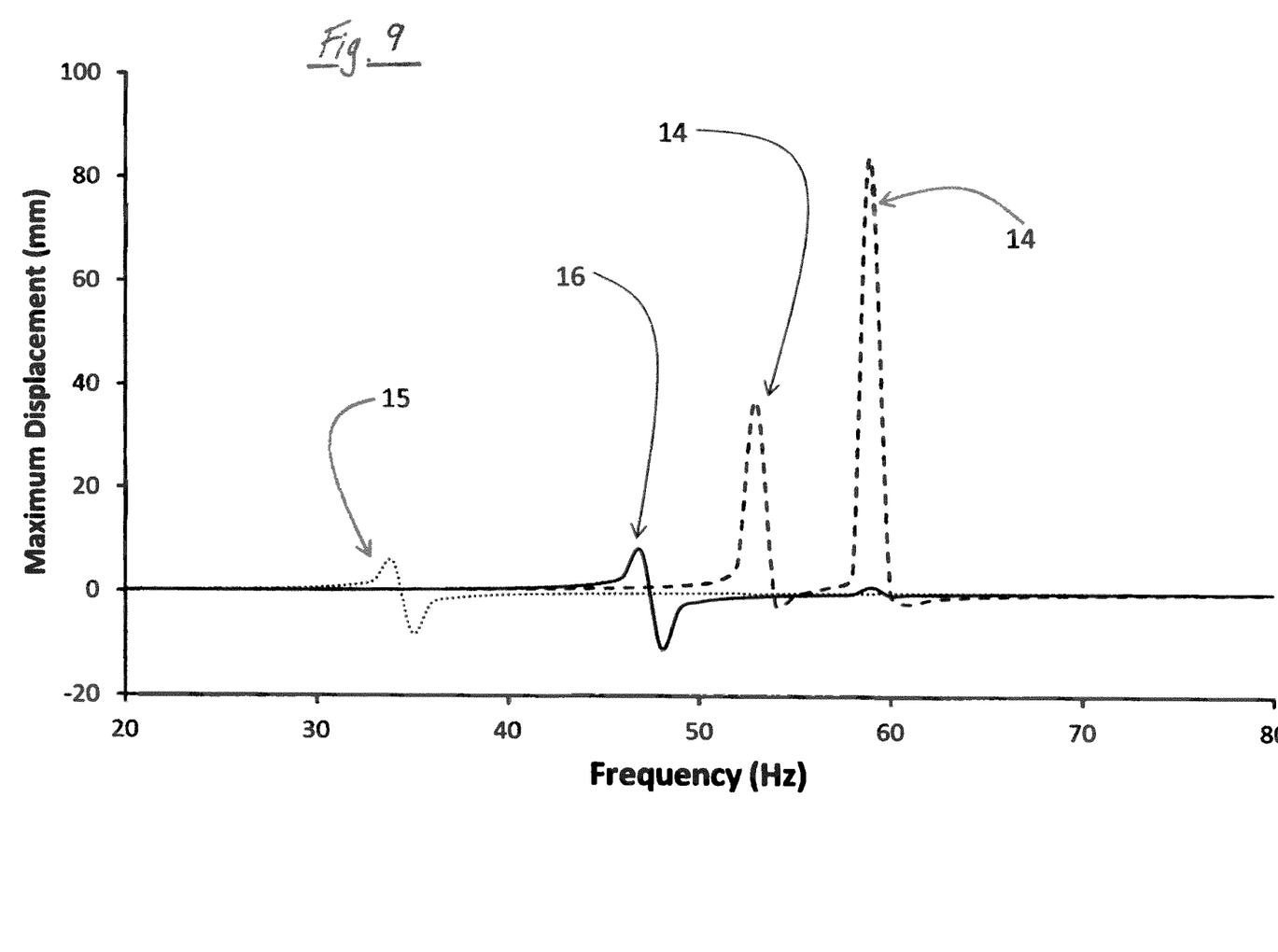
FIG. 9 is a graph showing maximum total displacement on a scarf plate formed of different stiffness materials.

On this basis, the model was used to predict the maximum displacement of the surface of the scarf plate 2 as the stiffness of the scarf plate material was varied. Three different materials were considered: a low-stiffness material such as a polymer, a medium stiffness material such as aluminium and a high stiffness material such as steel. FIG. 9 illustrates, in graphical form results of the simulations for three such materials. It can be seen that for the least stiff material the displacement 14 was greatest, and the dominant resonant frequencies were higher. The stiffest material showed the least displacement 15 and lowest dominant resonant frequencies. The material of intermediate stiffness showed a correspondingly intermediate displacement 16.

The analysis demonstrates the phenomenon that increasing the stiffness of the scarf plate decreases the maximum displacement of the scarf plate surface, leading to the most consistent movement of the plate surface across the plate width. In other words, increasing the stiffness of the scarf plate minimises deformation of the scarf plate surface (where deformation in this case is defined as is the distance that an object bends or twists from its original position relative to other points on the surface of the scarf plate 2, not included the rigid movement of the body exerted by an external force) leading to the most consistent movement of the plate surface across the plate width. An initial consideration might therefore lead the designer to merely choose a material having a high inherent stiffness (e.g. to choose steel over aluminium or a polymer). However, in practice, materials of increased stiffness generally have a higher density. The result of this is that the scarf plate will have a greater mass, and more power will be required to cause the plate oscillations.

The inventors have found, however, that increased stiffness of the feeder plate of a vibratory feeder can be achieved without a corresponding increase in mass, by the use of composite materials.

Figure 10:
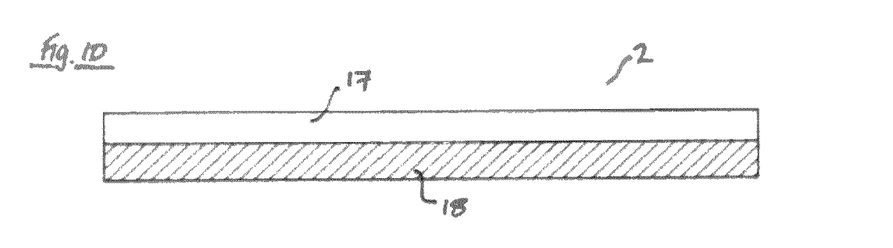
FIGS. 10-12 illustrate various arrangements of layers in vibratory feeder plates of the invention.

FIG. 10 illustrates, in cross-sectional view, a feeder plate of the invention, generally indicated by 2. The plate 2 comprises a first, upwardly-facing (in use) layer 17 of solid material, attached to a second downwardly-facing layer 18 formed of a material having voids that reduce its bulk density. The top solid layer 17 provides a powder-contacting surface that can be readily cleaned, and is unlikely to harbour microbial contamination. This would be important if e.g. the vibratory feeder was to be used in a food processing context. The second layer 18 provides stiffness by virtue of its microstructure, rather than by the inherent qualities of the bulk material from which it is formed. Example materials would include metal foams, sintered metals and ceramics. If closed cell metal foams are employed, then these provide more resistance to the possible ingress of contaminants. Generally, such a construction provides a vibratory feeder plate 2 having a stiffness that is greater than the stiffness of a feeder plate of the same mass formed from the solid material of the first layer 17. The second layer 18 imparts a stiffness on the laminate that enables the top layer 17 and the second layer 18 to move together in the same directions to minimise deformation of the top layer surface.

FIG. 11 illustrates, again in cross-sectional view, an alternative feeder plate of the invention, generally indicated by 2. In this embodiment, the feeder plate comprises two layers 17, 18 as described in relation to the embodiment of FIG. 10, and an additional third layer 19 comprising a solid material, optionally the same material as the top layer 17. In this way, the exposed faces of the feeder plate 2 are effectively sealed against contaminants. It is not necessary that the first solid layer and the third layer of solid material are parallel, in some embodiments, the third layer of solid material is not parallel with the first solid layer. In preferred embodiments, the distance between the third layer of solid material and the first solid material is narrower at the open edge of the feeder plate. The angle at which the distance between the third layer and the first layer narrows is selected to minimise mass where not required for stiffness.

Figure 11:
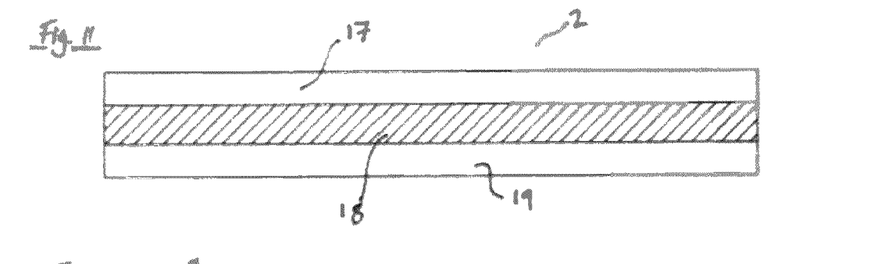

In embodiments where a third layer of solid material 19 is present, the second layer 18 imparts a stiffness on the laminate that enables the top layer 17 and the second layer 18 to move together in the same directions and minimise deformation of the top layer surface.

Figure 12:
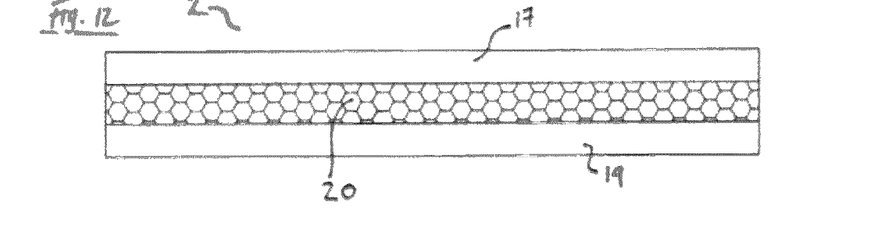
Figure 13:
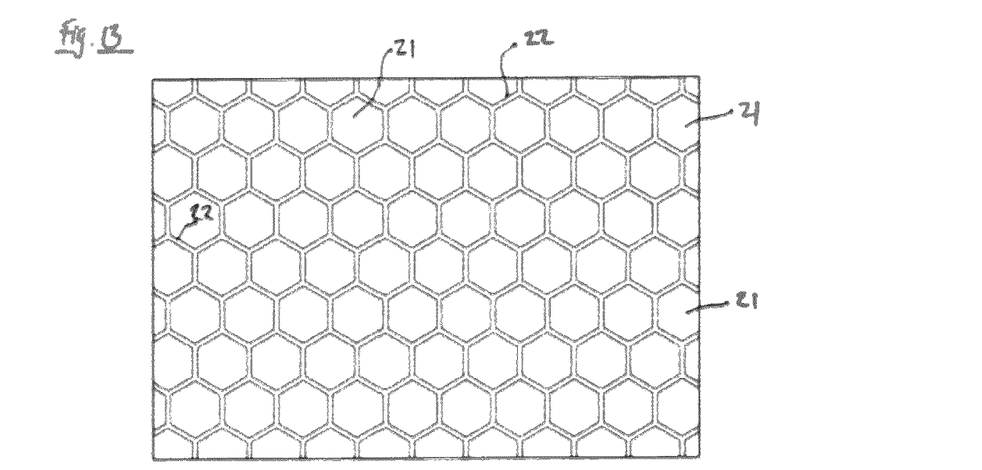
FIG. 13 is a plan view of a section of cellular material forming part of a vibratory feeder plate of the invention.

FIG. 12 illustrates a third embodiment of a feeder plate of the invention, again generally indicated by 2. In this embodiment, solid layers 17, 19 are provided on the top and bottom of the feeder plate, and these sandwich an internal layer 20 of a cellular material (i.e. a material having regularly-shaped, gas-filled holes within it). FIG. 13 illustrates, in plan view (not at the same scale) such a cellular material having voids 21 in the form of hexagonal prisms separated by walls 22 formed of a solid material. Such a structure is similar to that of a honeycomb, and is preferably arranged such that the voids run vertically from the upper layer 17 to the lower layer 19.

Figure 14:
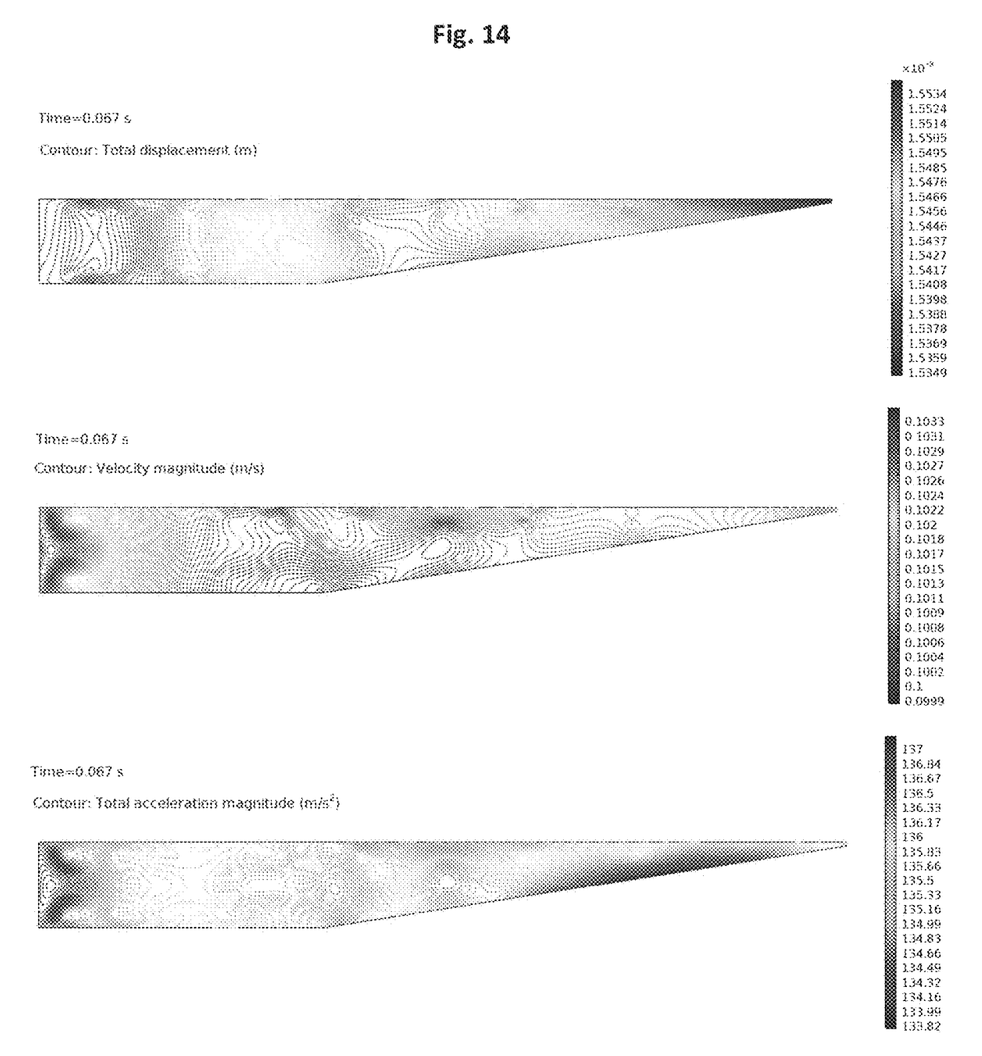
FIG. 14 shows profiles of displacement, velocity and acceleration of a traditionally manufactured vibratory feeder plate where stiffness is imparted by folds in the metal. The profiles were taken 0.067 seconds into a simulation driven at 48 Hz.

FIG. 14 shows profiles of displacement, velocity and acceleration of a traditionally manufactured vibratory feeder plate (scarf plate) where stiffness is imparted by folds in the metal. The profiles were taken 0.067 seconds into a simulation driven at 48 Hz.

Figure 15:
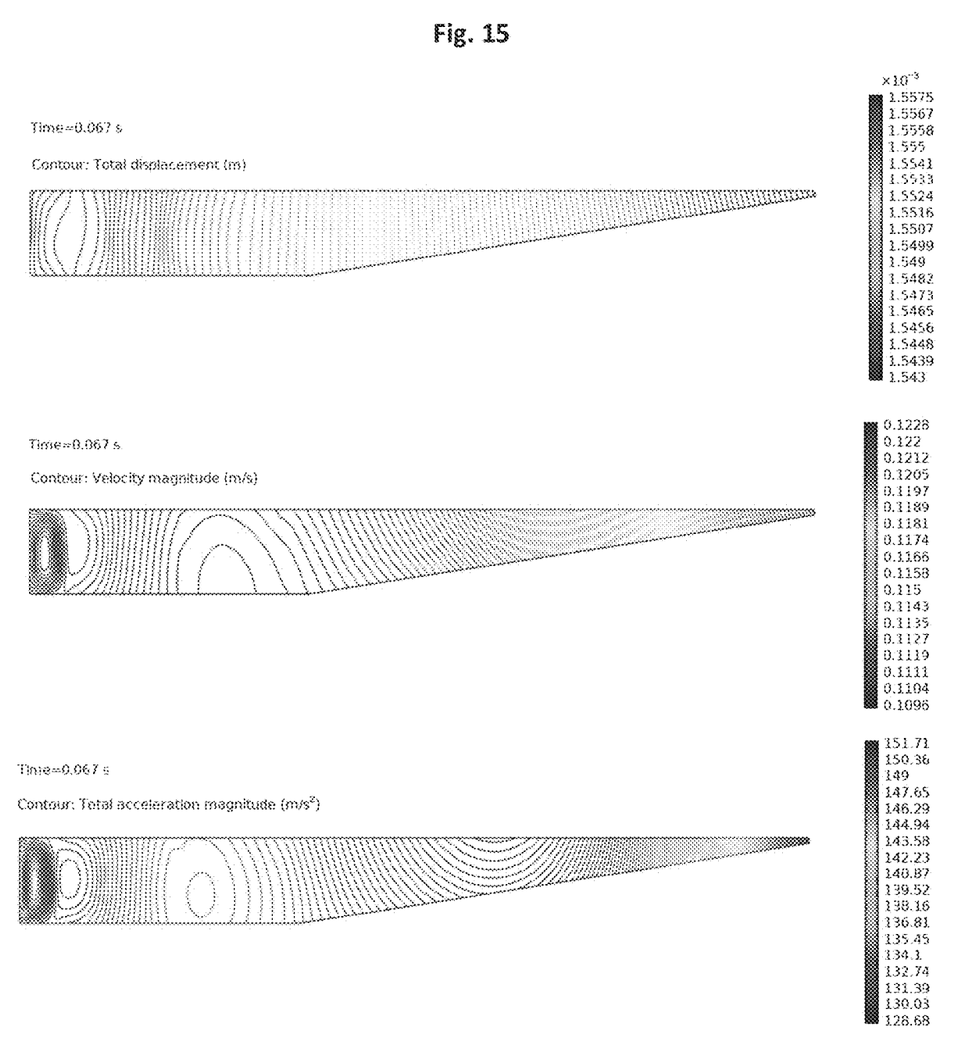
FIG. 15 shows profiles of displacement, velocity and acceleration of a vibratory feeder plate of the invention comprising 50 mm of a honeycomb layer between the first solid layer and a third layer of solid material (vertical honeycomb). The profiles were taken 0.067 seconds into a simulation driven at 48 Hz.

FIG. 15 shows profiles of displacement, velocity and acceleration of a vibratory feeder plate (scarf plate) of the invention comprising 50 mm of a honeycomb layer between the first solid layer and a third layer of solid material (vertical honeycomb). The profiles were taken 0.067 seconds into a simulation driven at 48 Hz. By comparing FIGS. 14 and 15, it can be seen that the scarf plate of the invention with the honeycomb second layer delivers a much more uniform vibrational pattern than the traditional scarf plate of FIG. 14.

Figure 16:
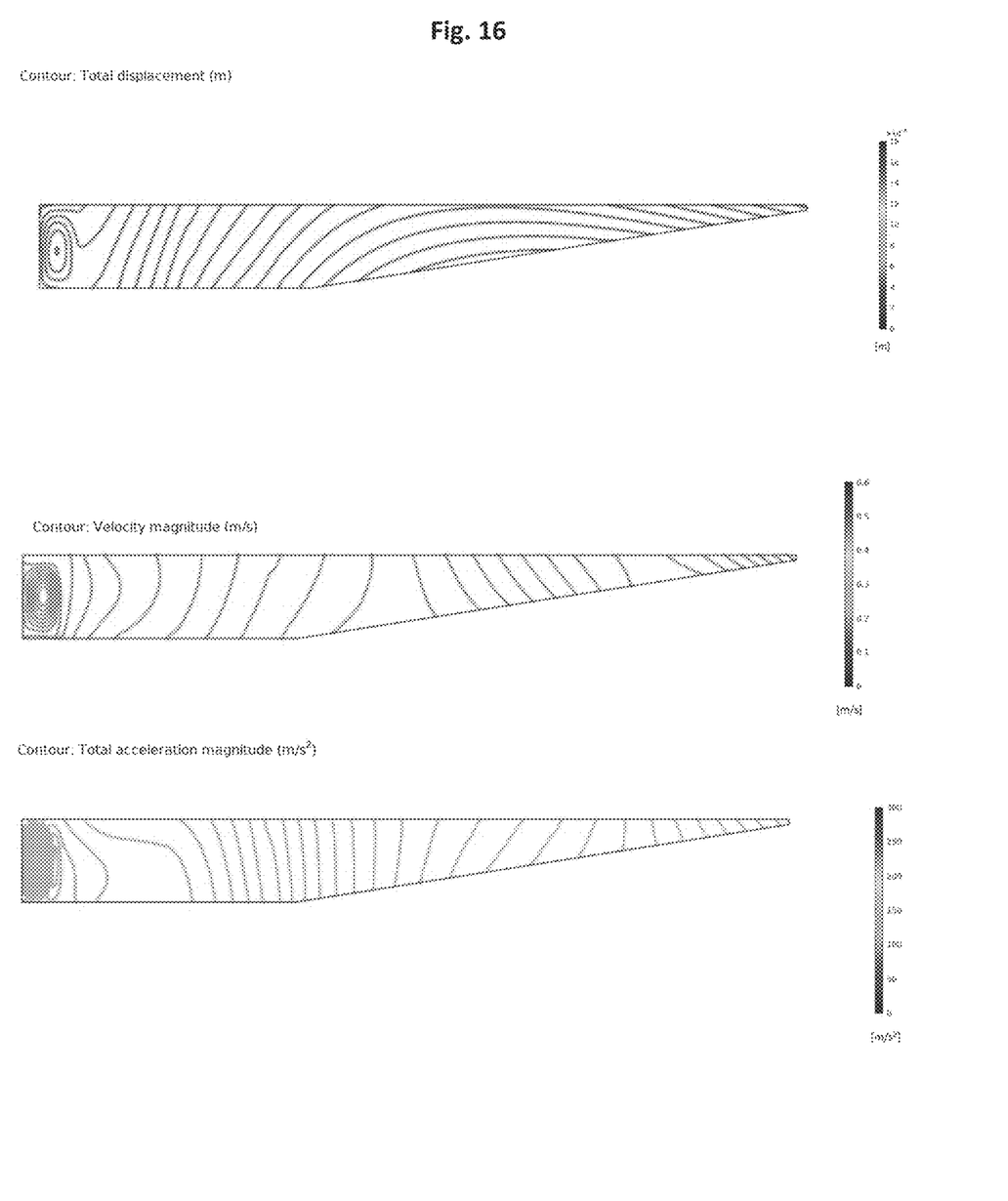
FIG. 16 shows profiles of displacement, velocity and acceleration of a vibratory feeder plate of the invention comprising 100 mm of a honeycomb layer between the first solid layer and a third layer of solid material, where the honeycomb layer was rotated such that the tubes formed by the honeycomb were parallel with the first and second solid layers (rotated honeycomb). The profiles were taken 0.056 seconds into a simulation driven at 48 Hz.
Figure 17:
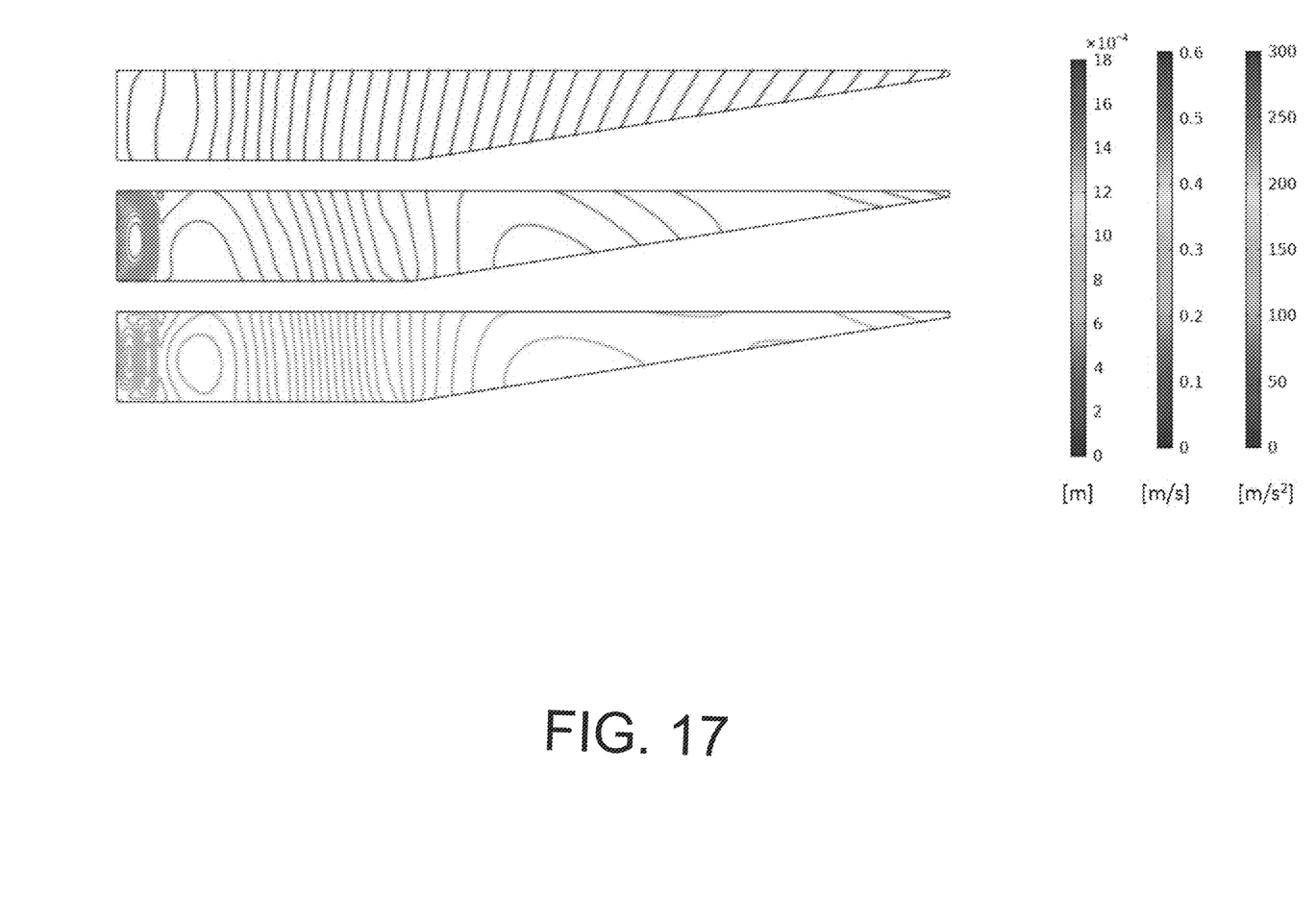
FIG. 17 shows profiles of displacement, velocity and acceleration of a vibratory feeder plate of the invention comprising 50 mm of a vertical honeycomb layer between the first solid layer and a third layer of solid material. The profiles were taken 0.056 seconds into a simulation driven at 48 Hz.
Figure 18:
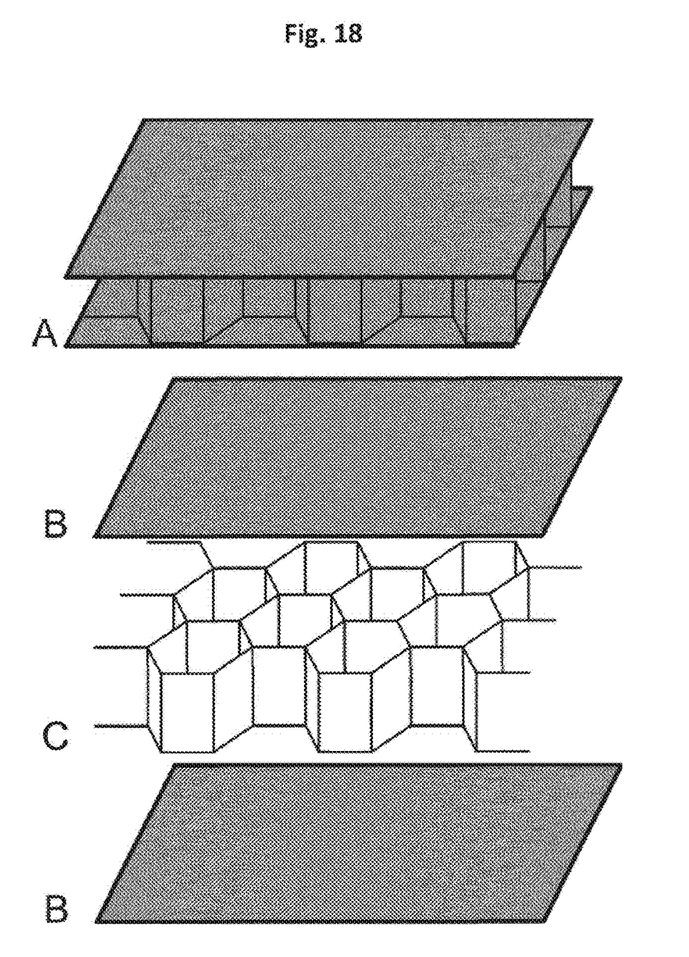
FIG. 18 shows the preferred vertical honeycomb configuration.

FIG. 16 shows profiles of displacement, velocity and acceleration of a vibratory feeder plate of the invention comprising 100 mm of a honeycomb layer between the first solid layer and a third layer of solid material, where the internal honeycomb structure was rotated 90° such that the tubes formed by the honeycomb were parallel with the first and third solid layers (rotated honeycomb). The profiles were taken 0.056 seconds into a simulation driven at 48 Hz. Whist many features were the same for the vertical honeycomb and the rotated honeycomb, at several time periods through the cycle, the displacement pattern was seen to be less uniform in the rotated honeycomb than the vertical honeycomb. For comparison, FIG. 17 shows the vertically orientated honeycomb at the same time stamp (0.056 seconds) showing a more uniform profile. This leads to the conclusion that vertical honeycomb is preferable, as shown in FIG. 18. It can be said the stiffness of said feeder plate is preferably in the plane perpendicular to the delivery surface of the vibratory feeder. However, in some embodiments, the stiffness of said feeder plate may be in the plane parallel to the delivery surface of the vibratory feeder. In other embodiments, the stiffness of said feeder plate is isotropic.

The invention claimed is:

1. A vibratory feeder comprising a feeder plate that includes a laminate of a first solid layer and a second layer comprising voids, wherein a stiffness of the feeder plate is greater than a stiffness of a feeder plate of a same mass formed from solid material of the first layer.

2. The vibratory feeder according to claim 1 wherein the feeder plate further comprises a third layer of solid material arranged on an opposite side of the second layer to the first solid layer.

3. The vibratory feeder according to claim 1 wherein the second layer comprises a metal foam.

4. The vibratory feeder according to claim 1 wherein the second layer comprises sintered metal.

5. The vibratory feeder according to claim 1 wherein the second layer comprises a ceramic.

6. The vibratory feeder according to claim 1 wherein the second layer comprises a cellular matrix.

7. The vibratory feeder according to claim 1 wherein the second layer comprises an arrangement of spacers.

8. The vibratory feeder according to claim 1 wherein the second layer comprises a foamed polymer.

9. The vibratory feeder according to claim 1 wherein the second layer comprises glass.

10. The vibratory feeder according to claim 1 wherein the second layer comprises an aerogel.

11. The vibratory feeder according to claim 1 wherein a stiffness of the feeder plate is in plane parallel to the delivery surface of the vibratory feeder.

12. The vibratory feeder according to claim 1 wherein a stiffness of the feeder plate is isotropic.

13. The vibratory feeder according to claim 1 wherein the feeder plate is a scarf plate.

* * * * *